March 1, 1938.   G. L. DIMMICK   2,109,453
SOUND REPRODUCING APPARATUS
Filed Nov. 2, 1935

INVENTOR
GLENN L. DIMMICK
BY
ATTORNEY

Patented Mar. 1, 1938

2,109,453

UNITED STATES PATENT OFFICE 2,109,453

SOUND REPRODUCING APPARATUS

Glenn L. Dimmick, Audubon, N. J., assignor to Radio Corporation of America, a corporation of Delaware Application November 2, 1935, Serial No. 47,969

3 Claims. (Cl. 179—100.3)

This invention relates to the reproduction of sound from photograph or like records, and has for its principal object the provision of an improved apparatus and method of operation for reproducing sound from different types of records such as those having the positive and negative half cycles recorded on a single track, those having the alternate half cycles recorded on separate tracks or the like.

It is well known that the type of sound record produced by a photographic recorder is dependent on the form of light beam varied or modulated in accordance with the sound to be recorded. Thus in one type of single track recording, a triangularly-shaped light beam is vibrated transversely of a light slit. In the case of push-pull recording, a pair of triangularly-shaped beams having their vertices pointed in opposite directions are likewise vibrated transversely of a light-slit to record the positive and negative half cycles on separate tracks.

It is desirable to be able to reproduce these various types of records by means of a single apparatus which is readily adjusted to reproduce sound from the type of record which happens to be available. In accordance with the present invention, this result is achieved by means including a member which is provided with a variety of lens elements and is so mounted as to permit any one of these apertures to be readily brought into alinement with the optical axis of the reproducing apparatus.

The invention will be better understood from the following description when considered in connection with the accompanying drawing, and its scope will be pointed out in the appended claims.

Referring to the drawing.

The invention is in some respects an improvement on that disclosed by a copending Glenn L. Dimmick application, Serial No. 610,302, filed May 9, 1932 and assigned to the same assignee as the present application.

Figure 1:
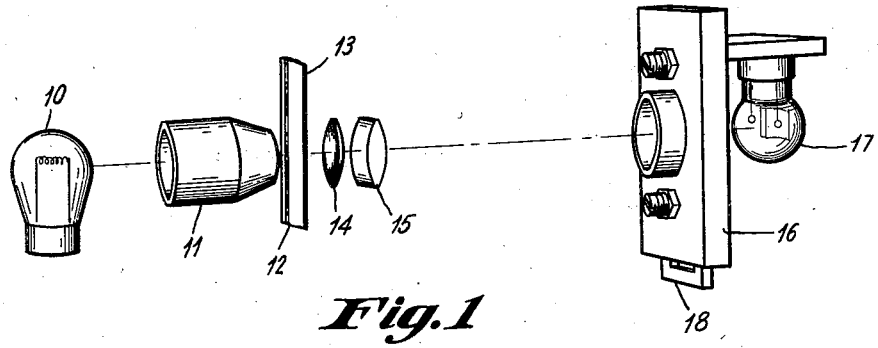
Fig. 1 is a perspective view indicating one suitable form of the invention.

The apparatus illustrated by Fig. 1 includes an exciter lamp 10 from which light passes through an optical unit 11 to the sound track 12 of a film type record 13. Light modulated as the result of the movement of the sound track transversely of the light beam passes through lenses 14 and 15 and through a lenticular element mounted in a casing 16 to a light responsive device 17 such as a photoelectric cell or the like. As will appear from the description of Figs. 2 and 3, the lens elements mounted within the casing 16 are adjustable by means of a handle 18.

Figure 2:
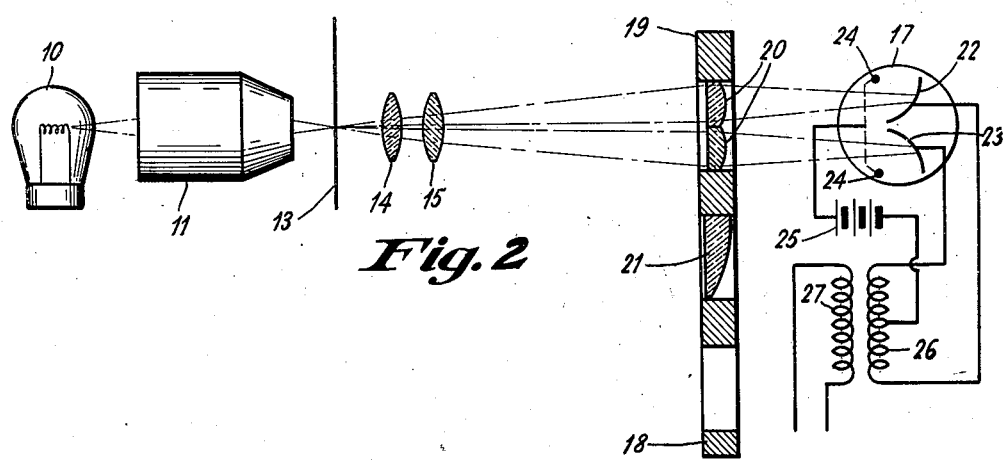
Fig. 2 illustrates the apparatus as adjusted for the reproduction of sound from a record whereon the alternate half cycles are recorded on separate tracks.

As appears more clearly in Fig. 2, the handle 18 is fixed to a member 19 arranged to be adjusted within the casing 16 and provided with a pair of apertures within one of which is mounted a pair of cylindrical lenses 20 and within the other of which is mounted a de-center or semi-cylindrical lens 21. With the member 19 adjusted to the position illustrated in this figure, a sound record whereon the positive and negative half-cycles are separately recorded on different tracks is reproduced. Thus, light from a positive half-cycle, for example, is transmitted through the upper cylindrical lens 20 to the cathode 22 of the photocell 17 and light modulated by the negative half-cycle track is likewise transmitted through the lower cylindrical lens to the cathode 23 of the photocell. It will be observed that the anodes 24 of the photocell are connected through a battery 25 to the mid-tap of a transformer primary 26 and that the cathodes 22 and 23 are connected to the end terminals of this winding. Inductively associated with this primary winding 26 is a secondary winding 27 through which audio frequency current may be supplied to the input of a suitable amplifier and from thence to a loudspeaker.

Figure 3:
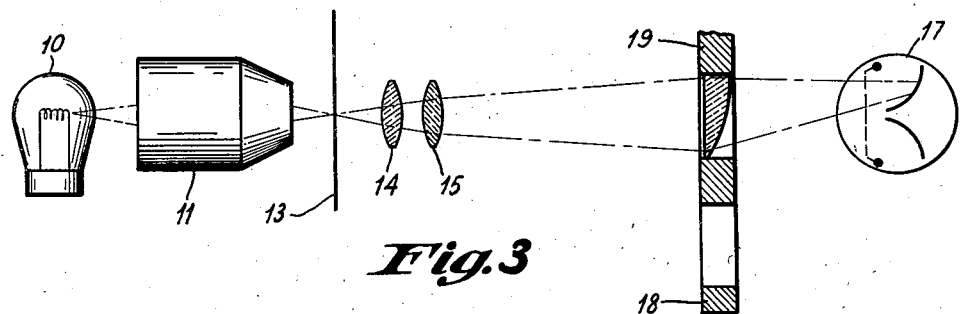
Fig. 3 illustrates the apparatus as adjusted for the reproduction of sound from a single track record.

With the member 19 adjusted to the position illustrated in Fig. 3, the apparatus is adapted to reproduce sound from a single sound track. The connections for such reproduction are the same as those illustrated in Fig. 2, nothing more than the adjustment of the member 19 being required to adapt the apparatus for reproduction of one or the other of the types of sound track mentioned above. As will be readily understood, this simple adjustment is highly advantageous in cases where different types of sound track are required to be reproduced.

I claim:

1. In a sound reducer, an optical system including a lens mount provided with a plurality of apertures, a pair of cylindrical lenses mounted in one of said apertures, a de-centered cylindrical lens mounted in another of said apertures, and means for moving either of said apertures into the optical axis of said system.

2. In a sound reproducer, an optical system including a lens mount provided with a plurality of apertures, a pair of lenses mounted in one of said apertures, a single lens mounted in another of said apertures, and means for moving either of said apertures into alinement with the axis of said system.

3. In a sound reproducer, an optical system including a lens mount provided with a pair of apertures, lens means mounted in one of said apertures for producing a plurality of light beams, lens means mounted in another of said apertures for producing a single light beam, and means for successively moving said apertures into alinement with the axis of said system.

GLENN L. DIMMICK.